July 20, 1937. R. C. AYERS 2,087,464
SEPARATOR FOR GRAIN AND SIMILAR COMMODITIES
Filed Dec. 30, 1935 2 Sheets-Sheet 1

Ray C. Ayers.
INVENTOR.

ATTORNEY.

July 20, 1937.   R. C. AYERS   2,087,464
SEPARATOR FOR GRAIN AND SIMILAR COMMODITIES
Filed Dec. 30, 1935   2 Sheets-Sheet 2
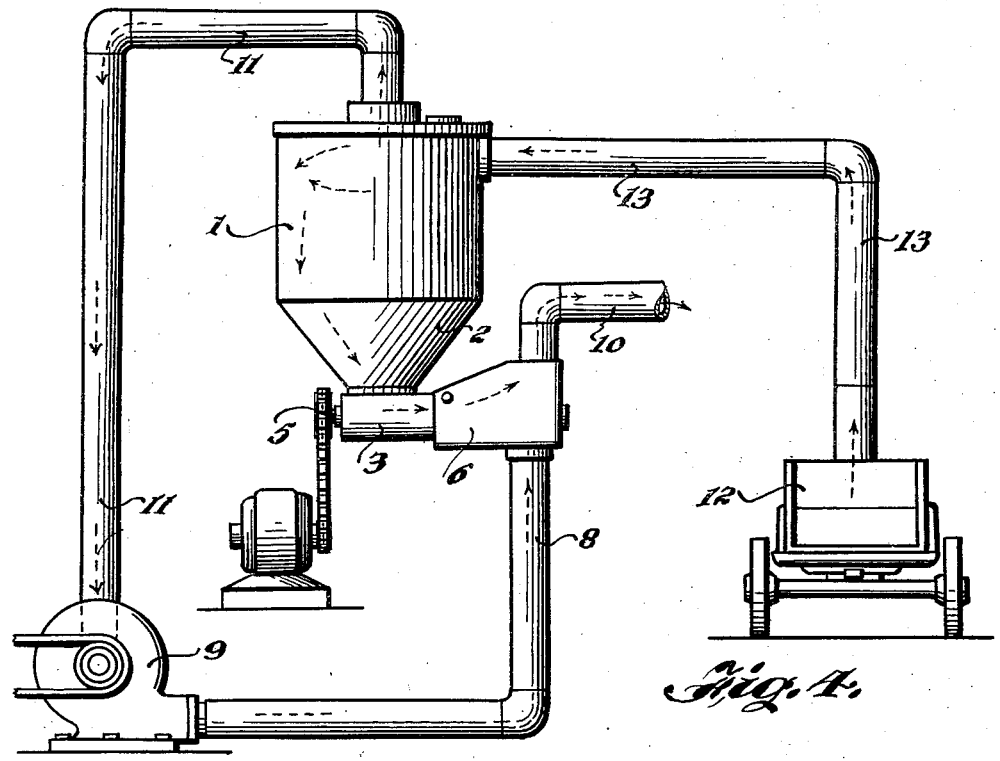
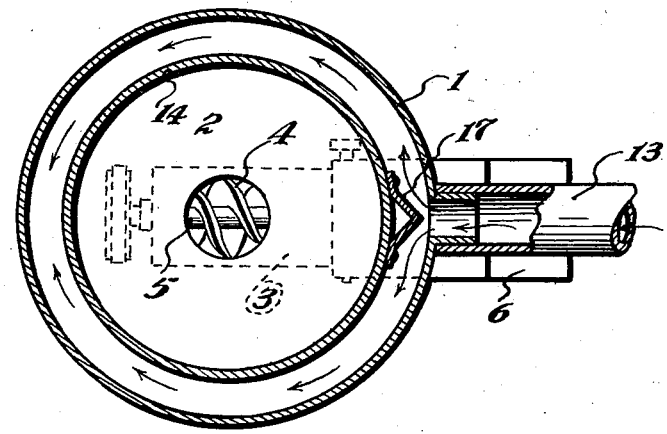
Ray C. Ayers,
INVENTOR
ATTORNEY Patented July 20, 1937

2,087,464

UNITED STATES PATENT OFFICE 2,087,464

SEPARATOR FOR GRAIN AND SIMILAR COMMODITIES

Ray C. Ayers, Slaton, Tex., assignor to Air-Way Elevator Company, Incorporated, Slaton, Tex., a corporation of Texas Application December 30, 1935, Serial No. 56,633

6 Claims. (Cl. 183—109)

This invention relates to certain new and useful improvements in separators for grain and similar commodities and it has particular reference to a separator or dropper, used in connection with grain handling and threshing plants and in which parts subjected to unusual wear are interchangeable or replaceable.

The principal object of the invention is to provide a separator having means by which to divide the influx of material into two streams, meeting at a point in the separator diametrically opposite the inlet and precipating out of the influence of air entering with the material and conveyed out of the separator at its bottom.

Another and important object of the invention is to provide a dividing means which when worn beyond effective use, may be replaced or repaired for further use, or, in extreme cases, inverted to expose unworn portions to the incoming material.

Another object of the invention is to provide a baffle, effective to segregate the air and material so that even the lightest particles will precipitate out with the heavier of the particles, thus insuring more complete separation than heretofore obtained and with less strain upon the suction elements.

With the foregoing objects as paramount, the invention has particular reference to its salient features of construction and arrangement of parts, to become manifest as the description proceeds, taken in connection with the accompanying drawings, wherein:—

Figure 4 is a schematic view of the commodity handling system of which the separator is a part, and Figure 5 is a plan view of the separator in transverse section on lines 5—5 on Figure 1.

Figure 3:
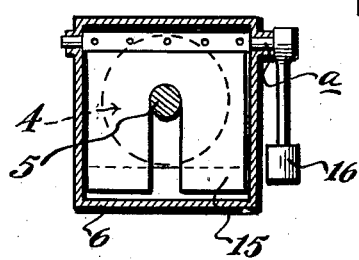
Figure 3 is a view on lines 3—3 on Figure 2.

Continuing with a more detailed description of the drawings, 1 designates a cylindrical housing having a hopper-like lower portion 2 which discharges into a conveyor housing 3. This housing has a flight or screw conveyor 4 therein on a shaft 5, the latter passing through an extended conduit 6 which is preferably square in transverse section (see Figure 3).

The conduit 6 is widened at its discharge end for the obvious purpose of preventing the material from becoming packed at its outlet and as a further insurance against this condition, fingers 7 are arranged on shaft 5 and gradually increase in length toward the end of the shaft or toward the outlet end of the feeding conduit.

Communicating with the conduit 6 is an air conduit 8, leading from the fan housing 9. (Figure 4.) Another conduit 10 provides a means by which the material is conveyed to the mill storage or other point of disposal.

From the suction port of the fan housing 9 extends a conduit 11, communicating with the top of the separator housing 1. Obviously, suction created by the fan in housing 9 sets up a partial vacuum within the housing 1, drawing material from the conveyance 12 (Figure 4) through pipe or conduit 13 into the housing 1. Material thus drawn into housing 1 is prevented from entering the suction pipe by the cylindrical baffle 14, having an open lower end (Figure 1).

Material entering the housing 1 by way of pipe 13 is divided into two streams, one passing around the baffle 14 in one direction and the other in the opposite direction, both streams meeting at a point diametrically opposite the inlet and from this point the material, propelled solely by inertia precipitates falling into the conveyor housing 3. A valve 15, comprised of a plate, hinged at $a$ and slotted to receive the shaft 5 functions to prevent interference by the partial vacuum in the separator of the proper discharge of material from the conduit 6. It will be noted that the plate 15 is urged normally to closed position by the counter-weight 16 (Figure 3) connected to the pivot shaft of the plate exteriorly of the conduit 6.

Figure 1:
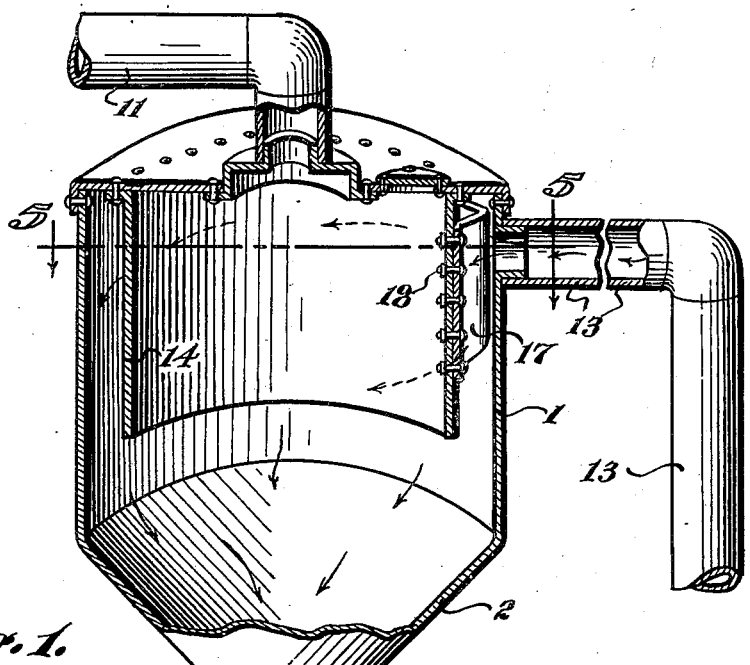
Figure 1 is a vertical sectional view showing a separator constructed according to the present invention.
Figure 2:
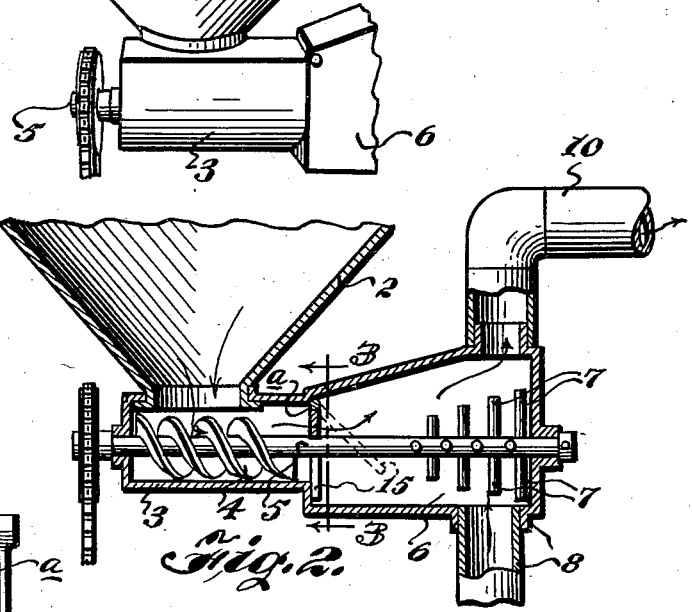
Figure 2 is a transverse section through the lower portion or discharge end of the separator.

The means by which the influx of material is divided into two separate streams is shown in Figures 1 and 5, and is comprised of a plate 17, which is V-shape in transverse section. This plate is removably secured by bolts 18 to the part of the cylindrical baffle 14 against which the material would ordinarily impinge upon entering the separator housing 1 through pipe 13. Being V-shaped, the material is divided into two streams and being removable, the plate 17 may be replaced or rebuilt when worn, which is a requirement found to be frequently necessary and is desirable since the material enters with such force that wear upon the contact surfaces is severe.

In operation, the fan in housing 9 is set in operation which pulls a partial vacuum in the separator housing 1 and in the pipe 13, thereby drawing material from the source 12 into the housing 1, which is divided into two streams by the V-shaped plate 17. The material is precipitated into the conveyor housing 3 and moved by conveyor 4 out of the influence of the suction, which is controlled to a certain degree by valve 15. Since the fan sets up a pressure in pipe 8, the material moved into conduit 6 is forced by such pressure into pipe 10, aided in this operation by fingers 7 which loosen the material in the conduit 6.

It is apparent from the foregoing that the handling of the material may be continuous with but little if any of the fine particles passing through the fan to impose wear thereon. Moreover, wear imposed upon the baffle 14 is neglible since for the greater part, the wear is on the plate 17 which can be replaced.

Manifestly, the construction shown and described is capable of considerable modification and such modification as is considered within the scope and meaning of the invention is also considered within the spirit and intent of the appended claims.

What is claimed is:

1. A commodity handling and separating apparatus including a shell having an air suction conduit communicating with its upper end and with a suction fan spaced apart from said shell, an air and material inlet, a cylindrical baffle within and in concentric relationship with said shell, a V-shape deflector plate removably secured to said baffle and confronting said inlet whereby to divide the material influx into two streams, meeting at a point diametrically opposed to said inlet and means below said shell for receiving and conveying precipitated material out of the influence of the air in said shell.

2. A separator for grain and the like comprising a cylindrical shell having a suction pipe communicating with its top and an air and material inlet pipe, a cylindrical baffle in concentric relationship with said shell, defining an annular passage between said shell and baffle, a substantially V-shaped deflector plate removably secured to said baffle and confronting the opening of said inlet pipe for dividing the material influx into two streams and means isolated from the influence of suction in said shell for conveying material out of said separator.

3. A separator for grain and the like including a cylindrical shell having a cylindrical baffle disposed therein in concentric relationship thereto to define an annular passage around said baffle, a suction pipe and a material inlet pipe, a material receiving and conveying means for moving material out of said shell, and a substantially V-shaped deflector plate removably secured to said baffle against which the incoming streams of material impinges for separating the influx into separate streams for reassociation and precipitation at a point in said shell diametrically opposite the inlet point thereof.

4. A separator for grain and analogous commodities, a cylindrical shell and a baffle disposed therein, in concentric relationship therewith, defining an annular passage, a suction pipe, an air and material inlet pipe through which material is drawn from its source by suction set up in said suction pipe, a substantially V-shaped deflector plate removably secured to said baffle whereby its apex will confront the material inlet of said shell to divide the material influx, into two streams, meeting at a point diametrically opposite said inlet and means for conveying material out of said separator.

5. In a separator for grain and other commodities, a cylindrical shell having a suction pipe and a material inlet pipe, a cylindrical baffle concentrically disposed in said shell and defining an annular space with which said inlet pipe communicates, means for conveying material out of said shell, out of the influence of air in said shell and a substantially V-shaped deflector plate removably secured to said baffle, against which incoming material impinges, for separating said incoming material into more than one stream.

6. In a separator for grain and like commodities, a housing having a suction pipe and a material inlet pipe, a material outlet and conveyor at the bottom of said housing, a suction fan having its suction side connected to said suction pipe and its pressure side to said material outlet, a baffle concentrically arranged in said housing to define an annular space with which said inlet pipe communicates, a V-shaped deflector plate removably secured to said baffle and confronting the discharge opening of said inlet pipe to divide the material influx into separate streams around said baffle.

RAY C. AYERS.